US005520402A

United States Patent [19]

Nestor et al.

[11] Patent Number: 5,520,402

[45] Date of Patent: May 28, 1996

[54] PORTABLE MOBILE STAND

[76] Inventors: Brian J. Nestor, 5537 Fairview Pl., Agoura Hills, Calif. 91301; Hans J. Evertse, 31143 Via Colinas-Unit 404, Westlake Village, Calif. 91362

[21] Appl. No.: 316,721

[22] Filed: Oct. 3, 1994

[51] Int. Cl.[6] ........................ B62M 1/14

[52] U.S. Cl. ........ 280/250; 280/250.1; 297/DIG. 4

[58] Field of Search ........ 280/211, 250.1, 280/250, 249, 242.1, 87.021; 297/DIG. 4, DIG. 10, 464

[56] References Cited

U.S. PATENT DOCUMENTS

| | | | |
|---|---|---|---|
| 2,572,149 | 10/1951 | Hind et al. | 280/250 X |
| 4,620,714 | 11/1986 | Davis | 280/250.1 |
| 4,807,897 | 2/1989 | Schultz | 280/250 |
| 4,809,997 | 3/1989 | Owens | 280/250 X |
| 5,340,139 | 8/1994 | Davis | 280/250.1 X |

FOREIGN PATENT DOCUMENTS

| | | | |
|---|---|---|---|
| 1301595 | 12/1972 | United Kingdom | 297/464 |

*Primary Examiner*—Margaret A. Focarino
*Assistant Examiner*—Victor E. Johnson
*Attorney, Agent, or Firm*—Jack C. Munro

[57] ABSTRACT

A portable mobile stand for a human which uses a pair of side member assemblies with a vertical support member being mounted therebetween. A human occupying compartment is located in the space provided between the side member assemblies. The vertical support member assembly includes a knee support pad and a hip support pad with a buttocks strap being connectable between the side member assemblies and locatable against the buttocks of the human user. A chest support pad is mounted on a support bar with this support bar being pivotally movably mounted on the vertical support member. This support bar is lockable at any one of various positions relative to the vertical support member. Each side member assembly includes a hand engagable handle with these handles being deflectable to a vertical out-of-the-way position. When these handles are located in the horizontal/usable position, such are locked in position. The support bar has a sleeve telescopicingly mounted thereon with movement of this sleeve relative to the support bar unfixes the support bar relative to the vertical support member and permits pivoting of the support bar.

3 Claims, 2 Drawing Sheets

PORTABLE MOBILE STAND

BACKGROUND OF THE INVENTION

1) Field of the Invention

The field of this invention relates to a stand for a human and more particularly to a stand for a human paraplegic that permits the paraplegic to be located in a standing position as the paraplegic moves about as opposed to the normal sitting position of a wheelchair.

2) Description of the Prior Art

It has been known that humans who have little or no muscular control of the legs have to operate from a seated position. A typical seated position would be a wheelchair.

Humans are not made to operate solely from a seated position. Numerous studies in the past have shown that standing is important for any human for the maintenance of good health and psychological well being. Also, the ability of a human to stand permits people to function in work and home environments which would be inaccessible from a wheelchair.

In the past there have been designed apparatuses that could be used by wheelchair bound individuals that would locate that individual in a standing position. One such apparatus is shown within U.S. Pat. No. 4,809,997. The structure of U.S. Pat. No. 4,809,997 and such other devices of the prior art have been complex in construction requiring a relatively high cost to manufacture and ultimately a high cost to the user. Also such prior art devices have incorporated little aesthetics resulting in the device not having an attractive appearance. However, such prior art devices have achieved the features of achieving a stand aiding device for a wheelchair bound individual.

SUMMARY OF THE INVENTION

The apparatus of the present invention provides a portable mobile stand for a human that has little or no muscular control of his or her legs. The apparatus is of a compact nature and readily fits within doorways, aisles and spaces that would normally be encountered in homes and offices. The apparatus is of sturdy construction and difficult to tip over in any direction. The apparatus also provides easy entry and exit by the user, not requiring assistance. The apparatus is easily adjustable to fit most sizes of humans. The apparatus also can be used within a wide range of activities, even sporting activities such as playing golf.

The portable mobile stand of the present invention is designed to be composed of few parts which can be readily assembled from a disassembled state by even unskilled individuals. The apparatus uses a pair of substantially mirror image side member assemblies that are both constructed of assembled metallic tubing. Each side member assembly includes support wheels that are to be in contact with the supporting surface on which the stand is located. Each side member assembly also includes a hand wheel. In between each hand wheel on each side member assembly is a chain which engages with one of the support wheels. Manual rotational movement of the hand wheel by the user will result in rotational movement of the support wheel to which it is connected and movement of the stand on the supporting surface. In between the side member assemblies is mounted a vertical support member. This vertical support member includes a knee pad and a hip pad, with the knee pad to be braced against the knees of the user and the hip pad to be braced against the hips of the user. Also located between the side member assemblies is a buttocks strap that is movable from a disengaged position to an engaged position in snug contact with the buttocks of the user. With the combination of the hip pad, the knee pad, and the buttock strap, the lower extremities of the user are now supported in an upright manner. The vertical support member includes a support rod on which is adjustably mounted a chest support pad. This support rod is movable between an upright position and a plurality of outwardly inclined positions. A sleeve is mounted on the support rod which can be manually moved to disengage a locking device for the support rod and would permit the support rod to be moved between the various positions. Also located between the side member assemblies is a platform with this platform being located directly adjacent the bottom area of the stand. The user's feet are to be located on this platform.

One of the objectives of the present invention is to construct the portable mobile stand of an assemblage of parts that can be readily disconnected so that the stand can be transported and/or shipped easily within a relatively small amount of space.

DETAILED DESCRIPTION OF THE PREFERRED EMBODIMENT

Figure 1:
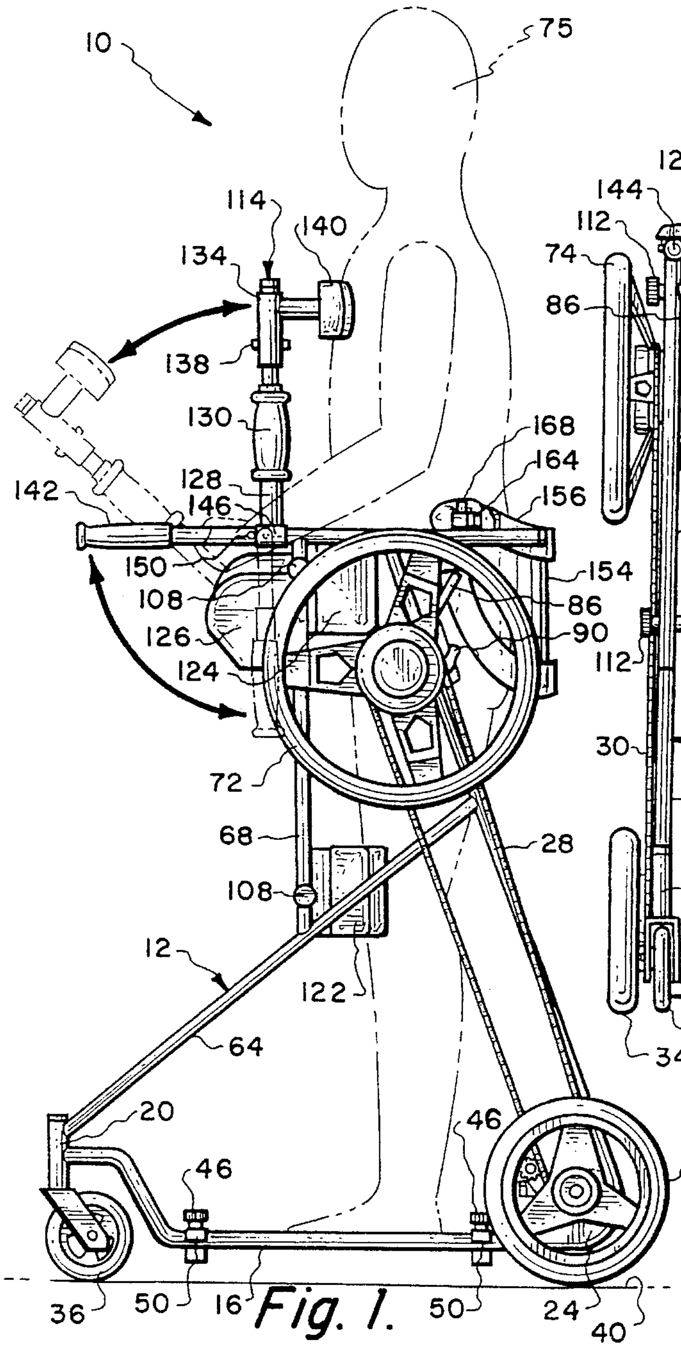
FIG. 1 is a side elevational view of the portable mobile stand of the present invention showing a typical user being located in conjunction with the stand.

Referring particularly to the drawings there is shown the portable mobile stand 10 of the present invention. The portable mobile stand 10 is constructed of a first side member assembly 12 and a second side member assembly 14. These side member assemblies 12 and 14 are basically identical except they are substantially mirror images of each other. However, there are slight differences in the construction between the two which are described further on in this specification.

Side member assembly 12 utilizes a bottom support tube 16 with the similar bottom support tube 18 being utilized by the side member assembly 14. The bottom support tube 16 is fixedly secured at one end to a sleeve 20. In a similar manner one end of the bottom support tube 18 is fixedly secured to a sleeve 22. The opposite end of the bottom support tube 16 is integrally secured to a joint frame 24 with the similar end of the bottom support tube 18 being integrally secured to a joint frame 26. Rotationally mounted on the joint frame 24 is a sprocket wheel (not shown) which engages with a chain 28. In a similar manner there is rotationally mounted on the joint frame 26 a sprocket wheel (not shown) which engages with a chain 30. Fixedly secured to the sprocket wheel that engages with the chain 28 is a support wheel 32. A support wheel 34 connects with the sprocket that engages with the chain 30.

A caster wheel 36 connects with the sleeve 20 with a similar such caster wheel 38 connecting with the sleeve 22. The caster wheels 36 and 38 and the support wheels 32 and 34 provide low frictional movement of the stand 10 of this invention on the supporting surface 40. A typical supporting surface would normally be a floor of a home or office. The bottom support tube 16 includes a pair of spaced apart holes 42. A similar pair of spaced apart holes 44 is formed within the bottom support tube 18. Each hole 42 is to connect with a screw type fastener 46 with each hole 44 to connect with a screw type fastener 48. Each fastener 46 passes through a hole formed within a bracket 50 with each fastener 48 also passing through a hole formed within a bracket 52. The brackets 50 and 52 are integrally connected to a platform 54. It is to be understood that the platform 54 is now fixedly secured between the side member assemblies 12 and 14 at what is deemed to be the lower or bottom end of the stand 10.

Extending in a generally upward direction from the joint frame 24 is a rear support tube 56. Side member assembly 14 also includes a similar such rear support tube 58 extending from the joint frame 26. The upper end of the rear support tube 56 is fixedly secured to a horizontal tube 60. In a similar manner the upper end of the rear support tube 58 is fixedly secured to a horizontal tube 62. Between the sleeve 20 and the rear support tube 56 is located a tubular brace 64. A similar such tubular brace 66 is located between the sleeve 22 and the rear support tube 58.

Fixedly secured and extending substantially vertically (or perpendicular relative to the planar surface of platform 54) is a brace tube 68. A similar such brace tube 70 is fixedly secured between the tubular brace 66 and the horizontal tube 62.

Rotationally mounted on the rear support tube 56 is a hand wheel 72. A similar such hand wheel 74 is rotationally mounted on the rear support tube 58. Hand wheel 72 is adapted to be engaged by the left hand of the human user 75 with the hand wheel 72 adapted to be engaged by the right hand of the human user 75. Mounted in conjunction with the hand wheel 72 is a sprocket 76 which engages with the chain 28. The sprocket 76 and the hand wheel 72 are rotationally mounted by bearing assembly 78 on flange 80 which is integral with the rear support tube 56. It is to be understood that the hand wheel 74 includes a similar sprocket 80, as well as a similar bearing assembly and flange attached to rear support tube 58 which are not shown.

Figure 3:
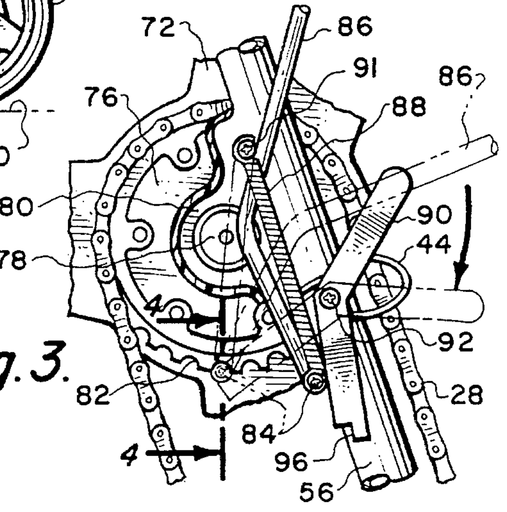
FIG. 3 is a cross-sectional view through the chain sprocket which connects with the hand wheel on one of the side member assemblies of the stand taken along line 3—3 of FIG. 2 showing clearly the locking arrangement that is usable in conjunction with the chain sprocket.
Figure 4:
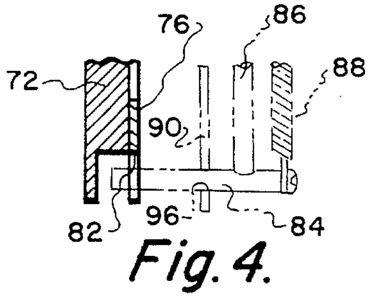
FIG. 4 is a cross-sectional view through a portion of this locking arrangement utilized in conjunction with the hand wheel chain sprocket taken along line 4—4 of FIG. 3.

The sprocket 76 includes teeth 82. It is the teeth 82 that engage with the chain 28. Also engagable with one of the teeth 82 is a locking rod 84. This locking rod 84 is integral with an actuating rod 86. The actuating rod 86 is pivotally mounted to the flange 80. This pivot mounting of the actuating rod 86 permits the actuating rod 86 to be moved from the solid line position shown in FIG. 3 to the dotted line position. When in the dotted line position, the locking rod 84 connects with one of the teeth 82 of the sprocket wheel 76. When in the solid line position, the actuating rod 86 is pivoted so that the locking rod 84 is spaced from the teeth 82.

A coil spring 88 interconnects between the rod 84 and pin 91. The pin 91 is fixedly mounted on the flange 80. The coil spring exerts a compressive force on the actuating rod 86 tending to maintain the actuating rod 86 in the unlocked position which is the solid line position shown in FIG. 3 or when in the locked position, which is the dotted line position shown in FIG. 3, the spring force of spring 88 will also tend to maintain the actuating rod 86 in that position. This is deemed an over-the-center locking action. Overcoming of the bias the spring 88 is required in manually moving of the actuating rod 86 from either the unlocked position to the locked position and vice versa.

At times the user 75 needs to prevent the support wheels 32 and 34 from rotating. This fixation is required during entry and exit into the stand 10 by the user 75. In order to prevent the wheels 32 and 34 from rotating, each actuating rod 86 for each hand wheel 72 and 74 will be pivoted so that the locking rod 84 of each actuating rod 86 will engage with a tooth 82 of their respective sprocket wheels 76. It is important that this locking action be maintained since you have a human of limited mobility entering and exiting the stand 10. In order to insure that this locking action is maintained, there is a separate locking arm 90 which is pivotally mounted by a pin 92 to the rear support tube 56. There is a similar locking arm associated with the hand wheel 74. This locking arm 90 is connected to a wire spring 94 which exerts a continuous bias on the locking arm 90 tending to locate the locking arm 90 in the unlocked position which is shown in solid lines in FIG. 3. Pivoting of the locking arm 90 to the locked position will cause the cut-out end of the Locking arm 90 to be placed in snug contact with the locking rod 84 when it is engaged with a tooth 82. The cut-out 96 can only engage with the locking rod 84 when it is engaged with the tooth 82. This locking arm 90 thereby maintains the engagement of the locking rod 84 in conjunction with the tooth 82 and prevents such from being disengaged therefrom as long as the locking arm 90 is in this position. Once the user 75 has entered the stand 10 and placed himself in a fixed position therein, the user 75 then pivots the locking arm 90 counterclockwise from the position shown in FIG. 3 to disengage such from the locking rod 84. When the locking arm 90 is so disengaged, the actuating rod 86 can then be moved to the unlocked position which is when the locking rod 84 is displaced from the teeth 82 of the sprocket wheel 76. It is to be understood that this sequence of movements relative to the actuating rod 86 and the locking arm 90 must be accomplished for both of the hand wheels 72 and 74.

Associated with each chain 28 and 30 is a chain tightening mechanism in the form of an idler pulley 98 which is shown engaging with chain 30. Idler pulley 98 is rotationally mounted on a bracket 100. Bracket 100 is pivotally mounted on the joint frame 26. Connecting with the bracket 100 is a threaded fastener 102. The threaded fastener 102 is threadably secured within a hole (not shown) formed within the joint frame 26. Tightening of the fastener 102 pushes the idler pulley 98 against the chain 30 to remove any slack formed within the chain 30 and make it taut. A similar such idler pulley 104 is shown in conjunction with the chain 28.

The brace tube 68 includes a pair of spaced apart holes 106. Connecting with each hole 106 is a fastener 108. The brace tube 70 also has a similar pair of holes 110. Connectable with each of the holes 110 is a fastener 112. Mounted between the side member assemblies 12 and 14 is a vertical support member 114. The vertical support member 114 includes a vertical rod 116 which is fixedly secured between a lower cross tube 118 and an upper cross tube 120. The uppermost fastener 108 is fixedly secured into one end of the cross tube 120 with the uppermost of the fasteners 112 is being threadably secured within the other remaining end of the cross tube 120. The lowermost fastener 108 is threadably secured within one end of the cross tube 108 with the lowermost fastener 112 being threadably secured within the remaining end of the cross tube 118. The vertical rod 116 is mounted between the longitudinal centers of the cross tubes 118 and 120.

Fixedly mounted onto the rear surface of the cross tube 118 is a knee pad 122. Fixedly mounted on the rear surface of the cross tube 120 is a hip pad 124. The hips of the user 75 is to connect with the hip pad 124 whose ends are curved inwardly so as to give lateral restraint to the user's hips. The knee pad 122 comprises a pair of arcuate sections with each arcuate section to engage with a knee of the user 75. Fixedly mounted to the joined area of the vertical rod 116 and cross tube 120 is a ratchet mechanism which is covered by a ratchet mechanism housing 126. This ratchet mechanism is deemed to be conventional and forms no specific part of this invention. Connecting with the ratchet mechanism 126 is a support rod 128. This support rod 128 is capable of being located in an upright position as is shown in solid lines in FIG. 1, or is capable of assuming any one of several inclined positions with one such inclined position being shown in phantom lines in FIG. 1. Each time the support rod 128 is located in its established position, it is to get locked in place by the ratchet mechanism. This engagement of the locking device within the ratchet mechanism is accomplished by handle sleeve 130 which is mounted on the support rod 128. The handle sleeve 130 is capable of being longitudinally moved a short distance on the support rod 128. The normal rest position for the handle sleeve 130 is as is shown in the solid lines in FIGS. 1, 2 and 5 of the drawings. However, when the handle sleeve 130 is moved against the action of a spring (not shown) in the direction of arrow 132, the support rod 128 is unlocked from the ratchet mechanism thereby permitting the support rod 128 to be moved to any desired position.

The upper end of the support rod 128 has mounted thereon a sleeve 134. The sleeve 134 includes a series of holes 136, any one of which is to engage with a manually depressible pin 138. By permitting locating of pin 138 with each of the holes 136 thereby provides for height adjustment of the sleeve 134 on the support rod 128. Fixedly secured to the sleeve 134 is a chest pad 140. This height adjustment provided by the pin 138 and the sleeve 134 is so as to adjust the position of the chest pad 140 relative to the body of the user 75.

A handle tube 142 is mounted by a pivot joint to the horizontal tube 60. A similar handle tube 144 is mounted by a pivot joint (not shown) to the horizontal tube 62. A sleeve 146 is capable of covering the pivot joint for handle tube 142. In a similar manner a sleeve 148 is capable of covering the pivot joint for the handle tube 144. When the sleeves 146 and 148 cover their respective pivot joints, the handle tubes 142 and 144 are extended in a horizontal outward direction as is clearly shown in solid lines in FIGS. 1 and 5 of the drawings. However, during the performing of certain activities such as playing golf, these handle tubes 142 and 144 would interfere with the user 75 making a golf swing. Elimination of the tubes 142 and 144 is not desired since some kind of a forward brace is required during normal operation of the stand 10. However, to permit locating of the handle tubes 142 and 144 to a displaced out-of-the-way position, these handle tubes 142 and 144 can be displaced ninety degrees to a vertical position with tube 142 being located in juxtaposition to brace tube 68 and tube 144 located in juxtaposition to brace tube 70. To permit this type of deflecting movement to occur, pin 150 on handle tube 142 is compressed and sleeve 146 moved over pin 150 exposing the pivot joint (not shown). This will then permit the handle tube 142 to be moved to the deflected position directly adjacent the brace tube 68. In a similar manner the pin 152 is to be manually compressed and the sleeve 148 moved thereover, exposing the pivot joint for the handle tube 144 which then permits the handle tube 144 to be moved directly adjacent the brace tube 70.

Figure 2:
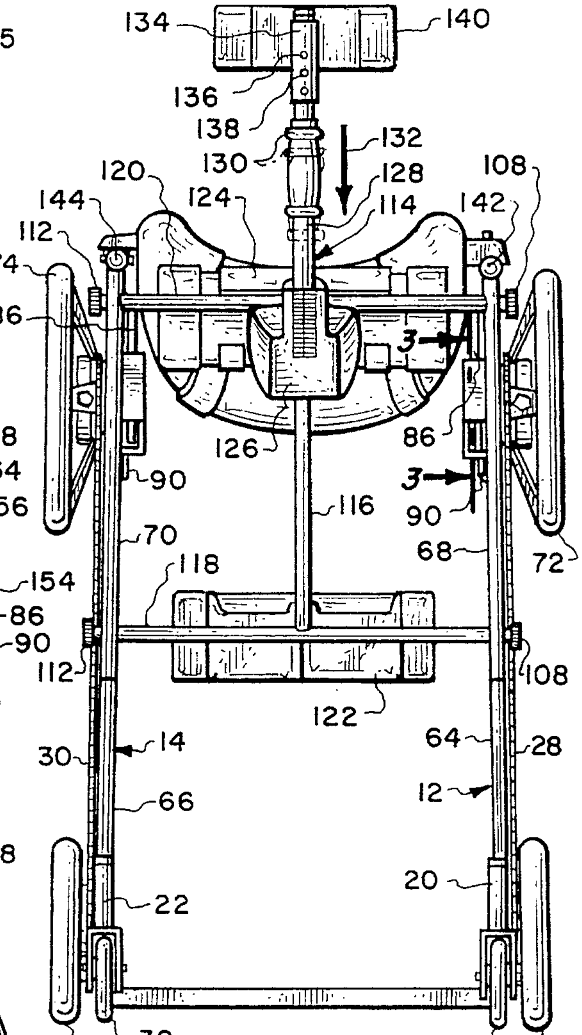
FIG. 2 is a front elevational view of the portable mobile stand of the present invention.
Figure 5:
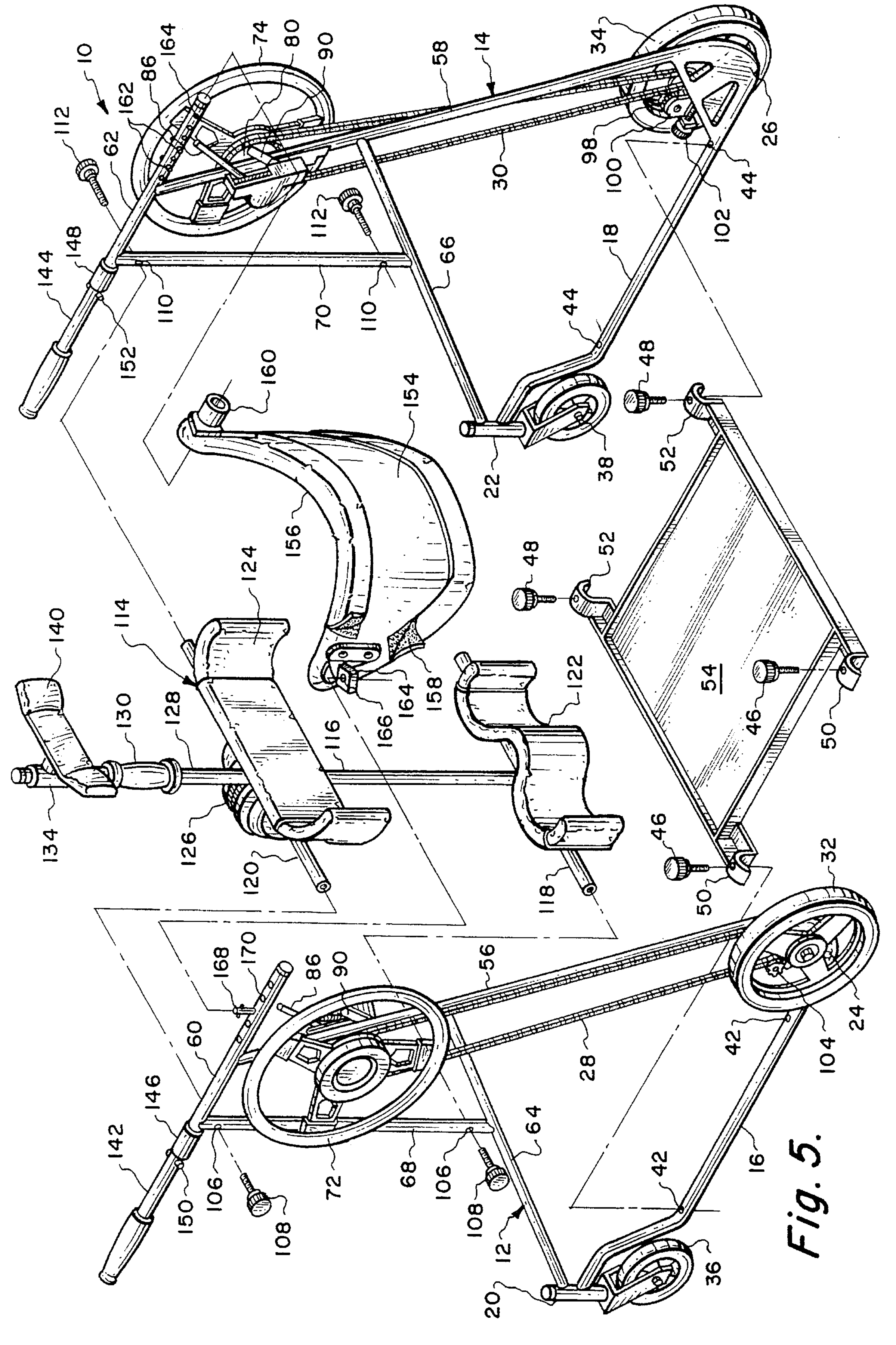
FIG. 5 is an exploded isometric view of the portable mobile stand of the present invention.

It is to be understood that once the handle tubes 142 and 144 are moved back to the solid line position shown in FIGS. 1 and 5 that only the sleeves 146 and 148 need to be slid back to their originally shown positions and the handle tubes 142 and 144 will then be relocated in their outwardly extending position.

In order to provide rear support for the buttocks of the user 75, there is provided a buttocks pad 154. The buttocks pad 154 is covered with a protective cover 156 which is fixedly mounted onto the frame of the buttocks pad 154 by means of a conventional type of fastener arrangement 158 which is commonly sold under the tradename of Velcro. One side edge of the buttocks pad 154 is mounted On a sleeve 160. Sleeve 160 is telescopicingly mounted on horizontal tube 62. The placement of sleeve 160 on horizontal tube 62 is to be adjusted by compressible pins 162 that connect with holes 164 formed within the tube 62. The buttocks pad 154 can then be pivoted between a position displaced laterally from the stand 10 (alongside of hand wheel 74) to a position located between the side member assemblies 12 and 14. When in this position, the buttocks pad 154 is to be in snug contact with the buttocks of the user 75. When in this position the buttocks pad 154 includes a bracket 164 that includes a hole 166. This hole 166 is to connect with a pin 168 which is threadably mounted within one of several holes 170 formed within the horizontal tube 60. A sufficient upward lifting motion would disengage the bracket 164 from the pin 168 so that it can be pivoted to the laterally displaced position directly adjacent the hand wheel 74 so as to permit entry and exit by the user 75 relative to the stand 10.

One of the particularly desirable features of the present invention is that side member assemblies 12 and 14 can be readily disconnected from the vertical support member 114 by merely disengaging of the fasteners 108 and 112. Removal of the platform 54 is also easily accomplished by disengaging of fasteners 46 and 48. In essence then the stand of the present invention is disassembled into four major parts which can be overlapped on each other to facilitate transporting and shipping. Buttocks pad 154 of course can be disengaged from the tube 170 during such transporting and shipping.

What is claimed is:

1. A portable mobile stand for a human comprising:

a first side member assembly, a second side member assembly, said first side member assembly located in juxtaposition to said second side member assembly, said second side member assembly being a substantially mirror image of said first side member assembly, both said first and said second side member assemblies including support wheels for movable engagement on a supporting surface, both said first and said second side member assemblies including a hand wheel, a drive chain connecting a said support wheel and said hand wheel for both said first and said second side member assemblies with there being two (in number) of said drive chains, manual operation of said hand wheels produces movement of said stand on said supporting surface;

a vertical support member located between and interconnecting said first side member assembly and said second side member assembly by first securing means, said vertical support member having a hip engaging pad adapted for engagement with the hip of a human user and a knee engaging pad adapted for engagement with the knees of a human user;

a platform located between and interconnecting said first side member assembly and said second side member assembly by second securing means, said platform adapted to be in contact with the feet of a human user for the purpose of supporting the human user;

a buttock strap connected between said first side member assembly and said second side member assembly, said buttock strap terminating in a first end and a second end, said first end of said buttock strap being connected by connection means to one of said side member assemblies and said second end of said buttock strap releasably secured to the other of said side member assemblies, said buttock strap adapted to be snugly located across the buttocks of a human user;

a chest support pad mounted on a support bar, said support bar mounted on said vertical support member, said chest support pad adapted to connect with the chest area of a human user; and said first securing means being readily disconnectable separating said vertical support member from said first side member assembly and said second side member assembly, said second securing means being readily disconnectable from said first side member assembly and said second side member assembly separating said platform from said first side member assembly and said second side member assembly, whereby said front side member assembly, said second side member assembly, said vertical support member and said platform can be transported, disconnected and then reconnected when it is desired to utilize said portable mobile stand and when disconnected said portable mobile stand occupies substantially less space facilitating portability.

2. The portable mobile stand as defined in claim 1 wherein:

said first side member assembly including a first handle, said second side member assembly including a second handle, both said first handle and said second handle adapted to be grasped by a human user, both said first handle and said second handle extending outward from said vertical support member; and said first handle being movable between a horizontal position and a vertical position, said second handle being movable between a horizontal and a vertical position, with said handles in said vertical position said handles being moved to a position eliminating interference in conjunction with a sporting activity to be engaged in by the human user, each said hand wheel being separately lockable by a locking means to prevent operation of said hand wheels and hence fixing in position of said stand on said supporting surface.

3. A portable mobile stand for a human comprising:

a first side member assembly, a second side member assembly, said first side member assembly located in juxtaposition to said second side member assembly, said second side member assembly being a substantially mirror image of said first side member assembly, both said first and said second side member assemblies including support wheels for movable engagement on a supporting surface, both said first and said second side member assemblies including a hand wheel, a drive chain connecting a said support wheel and said hand wheel for both said first and said second side member assemblies with there being two (in number) of said drive chains, manual operation of said hand wheels produces movement of said stand on said supporting surface;

a vertical support member fixed to and located between said first side member assembly and said second side member assembly, said vertical support member having a hip engaging pad adapted for engagement with the hip of a human user and a knee engaging pad adapted for engagement with the knees of a human user;

a platform fixed to and located between said first side member assembly and said second side member assembly, said platform adapted to be in contact with the feet of a human user for the purpose of supporting the human user;

a buttock strap connected between said first side member assembly and said second side member assembly, said buttock strap adapted to be snugly located across the buttocks of a human user;

a chest support pad mounted on a support bar, said support bar mounted on said vertical support member, said chest support pad adapted to connect with the chest area of a human user;

said support bar being pivotally mounted on said vertical support member between an upright position and various inclined positions, said support bar being fixable in position at said upright position or any one of said various inclined positions; and said support bar having a sleeve telescopingly mounted thereon, said sleeve being movable between a locking position and an unlocking position, with said sleeve in said locking position said support bar being fixed relative on said vertical support member, with said sleeve in said unlocking position said support bar in capable of being moved between said upright position and said various positions.

* * * * *